US006624874B2

(12) United States Patent
Revelli, Jr. et al.

(10) Patent No.: US 6,624,874 B2
(45) Date of Patent: Sep. 23, 2003

(54) APPARATUS AND METHOD FOR INSERTING AN UPDATEABLE HIDDEN IMAGE INTO AN OPTICAL PATH

(75) Inventors: Joseph F. Revelli, Jr., Rochester, NY (US); Chris W. Honsinger, Ontario, NY (US); Paul W. Jones, Churchville, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/027,293

(22) Filed: Dec. 21, 2001

(65) Prior Publication Data

US 2003/0117584 A1 Jun. 26, 2003

(51) Int. Cl.[7] .......................... G03B 21/32; H04N 7/167
(52) U.S. Cl. .............................. 352/90; 352/40; 352/85; 380/200
(58) Field of Search ................................. 382/115, 232, 382/239, 276, 279, 282, 283, 305, 306; 352/40, 55, 85, 90; 380/200–242, 54, 203, 207, 208

(56) References Cited

U.S. PATENT DOCUMENTS

| | | | | |
|---|---|---|---|---|
| 5,327,286 A | * | 7/1994 | Sampsell et al. | ............ 359/561 |
| 5,859,920 A | | 1/1999 | Daly et al. | .................. 382/115 |
| 5,872,648 A | * | 2/1999 | Sanchez et al. | ............. 359/290 |
| 5,903,648 A | * | 5/1999 | Javidi | .......................... 380/54 |
| 5,959,717 A | | 9/1999 | Chaum | ........................ 352/40 |
| 5,986,781 A | * | 11/1999 | Long | ........................... 359/30 |
| 6,002,773 A | * | 12/1999 | Javidi | .......................... 380/54 |
| 6,018,374 A | | 1/2000 | Wrobleski | .................. 348/744 |
| 6,044,156 A | | 3/2000 | Honsinger et al. | ............ 380/54 |
| 6,145,081 A | * | 11/2000 | Winograd et al. | .......... 713/200 |
| 6,404,926 B1 | * | 6/2002 | Miyahara et al. | ........... 382/232 |

OTHER PUBLICATIONS

Chapter 7, "Spatial Filtering and Optical Information Processing", *Introduction to Fourier Optics*, Joseph W. Goodman (McGraw–Hill Book Company, 1968).

* cited by examiner

*Primary Examiner*—Rodney Fuller
(74) *Attorney, Agent, or Firm*—Peyton C. Watkins

(57) ABSTRACT

An apparatus for optically embedding hidden data in a source image, wherein the hidden data is updateable in real-time, the apparatus includes (a) optical masks bearing a data image and an encoding carrier image either or both of which may be updated in real-time; (b) optical components for convolving, the data image with the encoding carrier image to produce a spatially dispersed data image; and (c) optical beam combiner for combining the spatially dispersed data image with the source image to produce a source image containing embedded hidden data.

14 Claims, 8 Drawing Sheets

APPARATUS AND METHOD FOR INSERTING AN UPDATEABLE HIDDEN IMAGE INTO AN OPTICAL PATH

CROSS-REFERENCE TO RELATED APPLICATIONS

The present application is related to U.S. Pat. Nos. 6,018,374; 6,044,156; 5,959,717; and 5,859,920.

FIELD OF THE INVENTION

The invention relates to the optical projection of images, and in particular to an optical apparatus for embedding updateable hidden information in a projected image.

BACKGROUND OF THE INVENTION

It is known that photographs or motion picture images (hereinafter referred to as source images) can have a visible message contained within the image area (for example: bar codes or date/time stamps). It is also known that numerous techniques exist to embed a hidden message within the image area of a source image. The hidden message may take on different forms, but in many techniques, the hidden message is a two-dimensional image that represents binary data or an icon (such as a copyright notice or a company logo). Such an image is hereafter referred to in the art as a data image. Applications for embedded data images include copyright protection and watermarking. A specific application in the motion picture industry is the detection and tracking of pirated movies that have been copied with video camcorders.

U.S. Pat. Nos. 6,018,374 and 5,959,717 relate primarily to film piracy in the motion picture industry. These patents disclose means for embedding data images in motion pictures by using combinations of two separate projection systems.

U.S. Pat. No. 6,018,374 discloses the simultaneous projection of the source image in the visible spectrum and a focused or unfocused data image in the infrared spectrum. The infrared data image would not be visible to the audience in the theater, but it would appear in a recording of the visual image made by a would-be thief using a video camcorder. Unfortunately, the deterrence to piracy can be overcome simply by using an infrared filter in front of the video camcorder to remove the unwanted data image.

U.S. Pat. No. 5,959,717 involves the combination of a film projector and an electronic video projector for showing a single composite motion picture. In one embodiment of this invention, hidden images or messages are embedded in motion pictures in the following way. A sub-area of the motion picture provided by the film projector is omitted or modified. The sub-area is a substantially smaller sub-area of the screen. The electronic video projector is coupled to a video source and is used to provide the image content of the omitted or modified sub-area on the projected film image. For example, the sub-area may include an alert message or a symbol that is camouflaged by the output of the video projector. When the composite motion picture due to both the film projector and the video projector are displayed, the hidden message is not visible to the audience. This invention improves copy protection of the film because a thief would have to steal both components in order to display a complete motion picture. However, once displayed as a complete motion picture, the hidden message is not visible, and consequently piracy of the motion picture in the theatre using a video camcorder is unaffected.

Other prior art techniques for embedding data images involve considerable computer processing. In these techniques, the data image is combined with the source image in such a way that it is very difficult to separate them without special knowledge (such as a secret key). Typically in these techniques, a source image in which a data image is to be embedded must first be converted to a digital file. Embedding is accomplished by computationally modifying the digital source file, followed by re-printing of the modified file. In many instances, however, it is not convenient or possible to process the source image in the digital domain, and it is necessary to embed the hidden data image by analog (i.e., optical) methods. For example, a conventional film-based movie projection system does not use a digital source file, and the embedding of a data image at the time of projection requires an optical method. Likewise, an optical method is required when embedding a data image during the manufacture of photographic film or paper or when producing photographic prints with an optical photographic printer.

U.S. Pat. No. 5,859,920 issued Jan. 12, 1999 to Daly et al. is a prior art technique for embedding digital data in images that can be implemented either in the digital or analog domain. In addition to the possibility for optical implementation, this technique has several other key advantages with respect to other known prior art methods, especially the techniques mentioned above in U.S. Pat. Nos. 6,018,374 and 5,959,717. These additional advantages include:

1) no visible distortion of the source image, yet the hidden message can be retrieved by suitable image processing;
2) the embedded data is not easily corrupted by source image content or defects; and
3) the embedded data is not lost when the image is cropped, rotated, resized or filtered.

The patent by Daly et al. discloses a method of embedding digital data that includes the steps of:

a) generating a data image from the digital data;
b) convolving the data image with an encoding carrier image to produce a spatially dispersed (also known as a phase dispersed or frequency dispersed) data image; and
c) adding the spatially dispersed data image to the source image to produce a source image containing the embedded data image.

The spatially dispersed data image represents a watermark pattern that is added to the source image. The data is recovered from the image by:

a) cross correlating the source image containing the embedded data image with a decoding carrier image to recover the data image; and
b) extracting the digital data from the recovered data image.

Provisions for an analog implementation of this method are also disclosed in U.S. Pat. No. 5,859,920. Although not specified in detail, the proposed analog method involves creation of "optical versions" of the data and encoding carrier images. Convolution of these optical versions " . . . may be performed optically using well known optical convolution techniques . . . ". The resultant spatially dispersed data image is then projected onto photographic film, photographic paper, or a theater screen along with the source image.

However, no provisions are made in the patent by Daly et al. to permit real-time modification of the data image. The ability to update the data image can be advantageous in many applications. For example, in motion picture projection systems, the data image may include date/time and theater/screen information for a particular showing of a movie. This information can later be extracted from a pirated video to determine the source of the illegal copy. Obviously, it is necessary to update this information prior to each showing of the movie. Moreover, it may be desirable to change the data image during the movie showing to allow the time stamp or other information to be updated at a specified interval, possibly with each projected frame.

It may also be advantageous to permit real-time modification of the encoding carrier image. Changing the encoding carrier image will cause the spatially dispersed data image (i.e., the watermark pattern that is added to the source image) to change, which can be particularly beneficial in a movie projection system. It is well known that using a fixed watermark pattern for all frames in a motion picture makes the watermark pattern vulnerable to removal using relatively simple image processing techniques. In addition, although the watermark pattern is usually embedded at very low signal amplitudes, a fixed watermark pattern combined with the changing source images of a movie sequence can produce a highly visible pattern that would be objectionable to a person viewing the movie. By changing the encoding carrier image with each projected frame or at a specified interval, these problems can be overcome.

Thus, there is need for a technique for embedding a data image in source images that:

1) incorporates all of the advantages of the spatial (or frequency or phase) dispersion method disclosed in prior art,
2) can be implemented entirely in the optical domain, and
3) allows the data image and/or encoding carrier image to be updated in real-time.

SUMMARY OF THE INVENTION

The present invention is directed to overcoming the problems set forth above. Briefly summarized, according to one aspect of the present invention, an apparatus for optically embedding an updateable hidden data includes:

a) optical masks bearing a data image and an encoding carrier image either or both of which may be updated in real-time;

b) optics for convolving, the data image with the encoding carrier image to produce a spatially dispersed data image; and c) optical beam combiner for combining the spatially dispersed data image with the source image to produce a source image containing the embedded hidden data.

The source image containing the embedded data can then be projected onto a motion picture theatre screen, photographic film in a camera, photographic paper in a photographic printer, or the sensor in a solid state imaging device, to name but a few.

The embedded data is recovered from the image by converting the source image containing the embedded data to a digital file and using the digital means as outlined above in U.S. Pat. No. 5,859,920. Alternatively, an optical mask bearing the source image containing the embedded data can be generated and optical cross-correlation with an optical mask bearing the encoding carrier image can be used to recover the hidden data image by optical means. The optical mask bearing the data-embedded source image is generally static during the recovery process; however, the mask bearing the encoding carrier image could be either static or electronically updateable.

BRIEF DESCRIPTION OF THE DRAWINGS

FIG. 6b is a schematic diagram showing in detail a section of the diagram shown in FIG. 6a;

FIG. 7b is a schematic diagram of the optical mask bearing the encoding carrier pattern, which is used with the tiled optical mask shown in FIG. 7a.

DETAILED DESCRIPTION OF THE INVENTION

Figure 1:
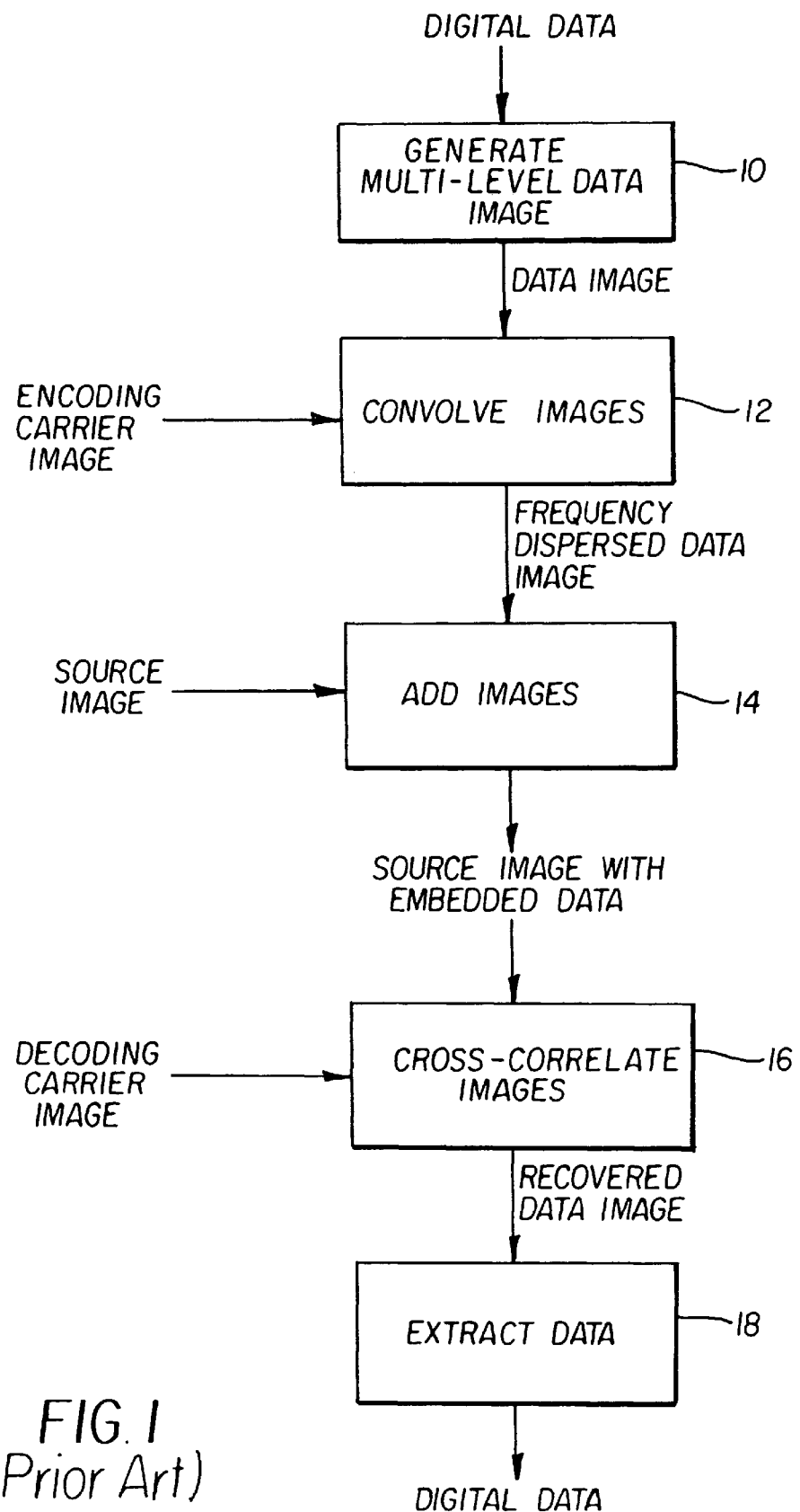
FIG. 1 is a flow chart illustrating generally the method of data embedding and extraction according to prior art.

FIG. 1 shows a flow chart illustrating generally the method of data embedding and extraction according to prior art. The invention can best be considered in its two stages: an encoding process and a decoding process. First a data image is generated 10 from digital information. The digital information may represent an identifier of the image such as a catalogue number, a copyright notice, information about the owner of the copyright, etc. The digital information may also represent theft deterrence information such as date, time, or location stamps. Such digital information is represented by a multi-level data image having a constant background value and an array of spots on the background. The digital information might also represent a human-interpretable iconic image (such as a copyright notice or company logo). In this case, the data image is equivalent to the iconic image.

Next, the data image is convolved 12 with an encoding carrier image to form a spatially dispersed data image. The encoding carrier image is preferably of random phase, low amplitude, and spanning a wide range of frequencies. A preferred method of constructing such a carrier is taught in U.S. Pat. No. 6,044,156. Upon convolution, the encoding carrier spatially disperses the data image and masks its visibility when added to the source image. The convolution can be performed on a digital computer with digital versions of the data image and the encoding carrier image. The convolution may also be performed optically using well known optical convolution techniques and optical versions of the data image and the encoding carrier image, as described in U.S. Pat. No. 5,859,920.

The spatially dispersed data image is then added 14 to the source image to form a source image with embedded data.

Figure 2:
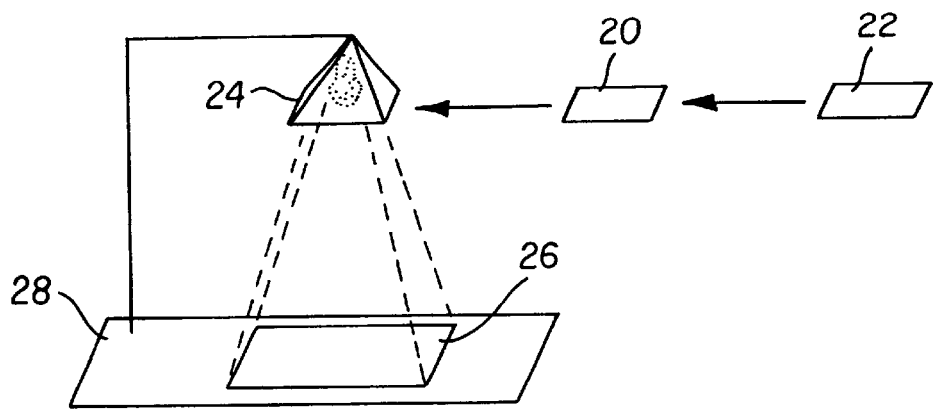
FIG. 2 is a schematic diagram illustrating one method of adding the spatially dispersed data image to the source image according to prior art.

The addition may be performed digitally using a digital computer, or it may be performed optically as shown, for example, in FIG. 2. FIG. 2 is a schematic diagram showing a photographic printer 28 wherein a photographic transparency 20 bearing the source image and a transparency 22 bearing a spatially dispersed data image are mounted on the printing gate 24 of the photographic printer 28. The images are optically added by superimposing them in the printing gate and simultaneously exposing them onto photographic paper 26.

According to the prior art, the digital data is recovered from the source image having the embedded data by first cross-correlating 16 the source image having the embedded date with the encoding carrier image to produce a recovered data image. The cross correlation may be performed in the digital domain by a digital computer and digital versions of the source image having the embedded data. Alternatively, the cross correlation may be performed using well-known optical means. Finally, the digital data is extracted 18 from the recovered data image.

As mentioned previously with respect to prior art, the use of optical means to accomplish signal processing is well known. For example, optical means for achieving linear or acyclic convolution of two images and linear or acyclic cross correlation of two images are described in Chapter 7 of *Introduction to Fourier Optics* by Joseph W. Goodman (McGraw-Hill Book Company, 1968).

Although the prior art patent by Daly et al. describes the use of optical methods for performing the data embedding and recovery, there are no provisions for real-time modification of either the data image or the encoding carrier image. As mentioned previously, it may be advantageous in many applications to provide updating of these images.

In a preferred embodiment of the present invention, updating of the data image and/or the encoding carrier image is achieved by using two-dimensional Spatial Light Modulators (SLM's). These devices, also known as "light valves", are basically two-dimensional arrays of electro-optic shutters that are individually addressable and electronically controlled. SLMs have been known for over a decade and can be found in a variety of commercial applications including video projectors in the motion picture industry and optical correlators, which are used in certain types of optical signal processors. With the exception of the DMD (Deformable Mirror Device) and the magneto-optic device, most SLMs are based on a liquid crystal layer as the active electro-optic medium, although some SLMs have employed solid-state electro-optic crystals as the active medium. An example of a commercially available SLM that is based on liquid crystal cells is the CyberDisplay model 1280, which is manufactured by Kopin Corporation, 695 Myles Standish Blvd., Taunton, Mass. This SLM is a transmissive device that can be updated at video rates. It uses twisted nematic liquid crystal as the active electro-optic medium and has 1280×1024 individually addressable pixels (1.3M pixels). Furthermore, it exhibits 256 grayscale levels (8 bits) and has an active display area of 19.2 mm×15.36 mm (0.96 inch diagonal).

Figure 3:
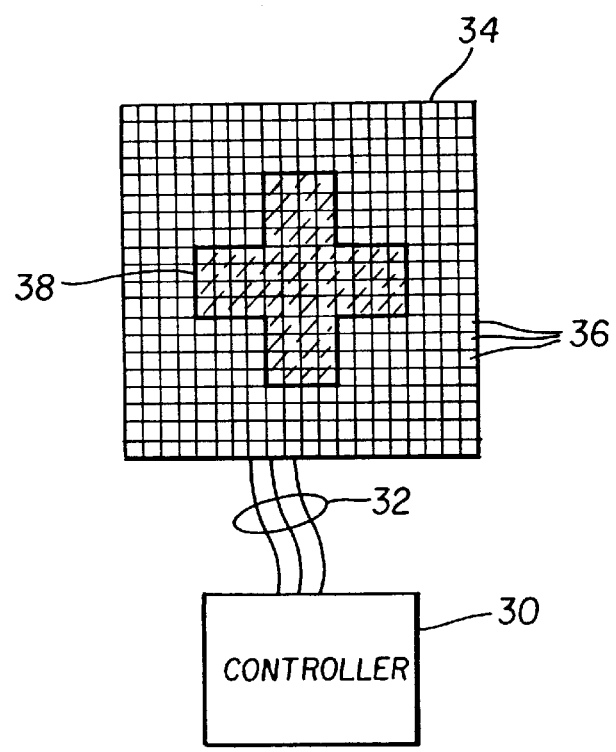
FIG. 3 is a schematic diagram illustrating the use of a spatial light modulator to generate an updateable mask bearing the data image in an all-optical data embedding system according to the present invention.

FIG. 3 illustrates the use of SLM 34 to form an updateable optical mask according to a preferred embodiment of the present invention. In FIG. 3 the image formed on the updateable optical mask bears the digital information, which is to be embedded or hidden in the source image. The digital information could be represented by a multi-level data image which is an image having a constant background value and an array of spots on the background representing the digital data. Alternatively, the data information could take the form of a grayscale pictorial or iconic image. It should be understood, however, that the image formed on the updateable optical mask could also correspond to the encoding carrier image. Thus, either one or both of the optical masks that correspond to the data image and encoding carrier image could be formed by an updateable SLM.

Referring again to FIG. 3, controller 30 is used to compose the data image and corresponding electronic signals are sent via connections 32 to SLM 34. SLM 34 is comprised of a plurality of light shutters or gates 36 such that the each light gate is controlled by the electronic signal from the controller via one of the connections 32. The intensity level of light transmitted through each gate varies in a continuous way in response to the electronic signal. In this way, a two-dimensional transmission pattern 38 is formed on the SLM, which corresponds to a multi-level data image or to a grayscale iconic image.

Figure 4:
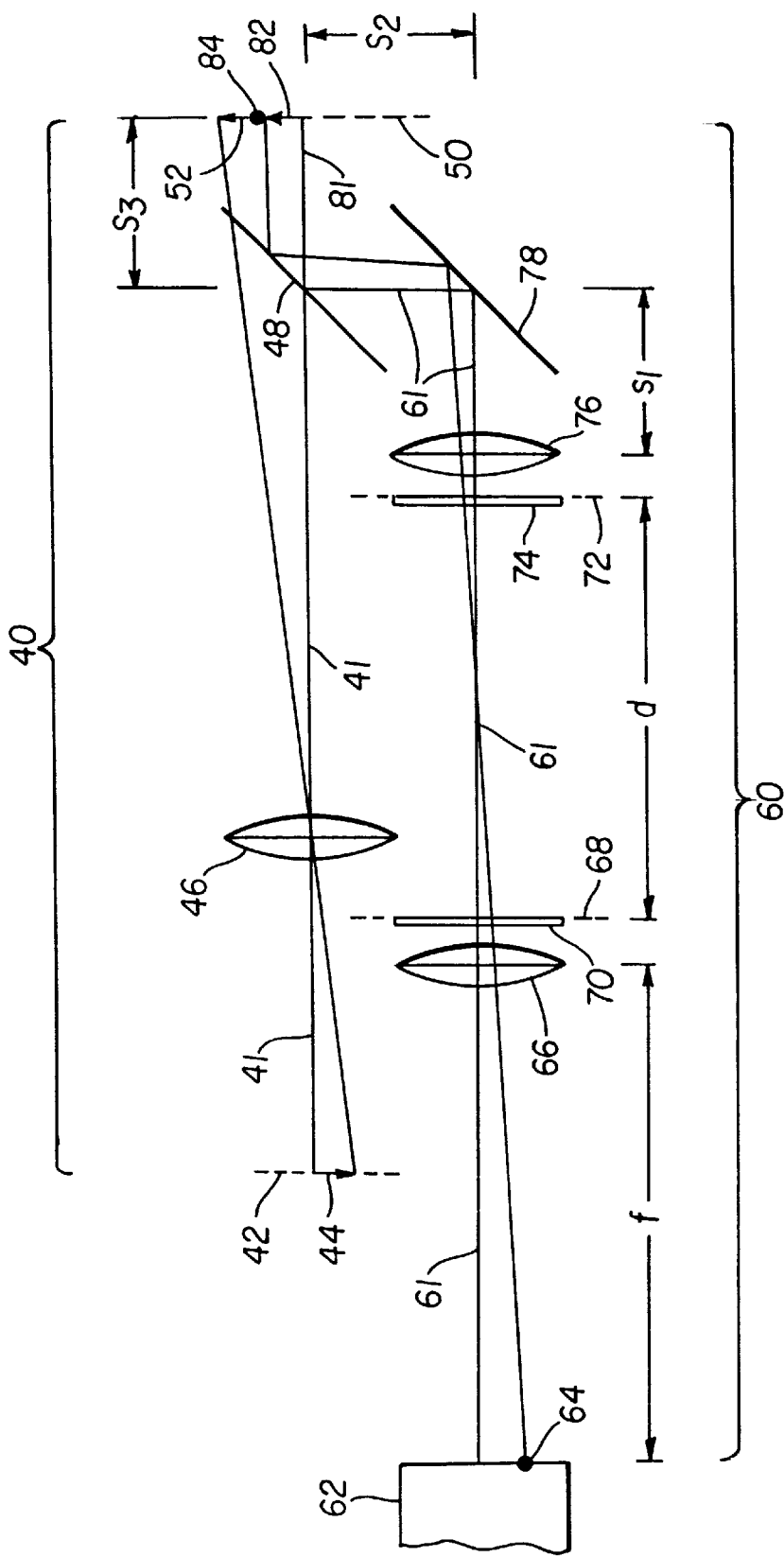
FIG. 4 is a schematic diagram illustrating one method for optically convolving in the spatial domain an updateable data image with the encoding carrier image and adding the resultant spatially dispersed data image to the source image according to the present invention.

FIG. 4 illustrates schematically one embodiment of an optical apparatus, according to the present invention, for embedding an updateable hidden image in a source image using the phase dispersion method. The optical apparatus shown in FIG. 4 comprises two distinct parts: an optical projection part 40 and an optical convolution part 60. In this embodiment the optical convolution is accomplished in the spatial domain. In a subsequent alternative embodiment, specification of an apparatus for accomplishing the convolution in the frequency domain will be described. In both embodiments it is assumed that the two patterns that comprise the data image and encoding carrier image, respectively, are square and are identical in physical size.

The optical projection part 40 images the source 44, which is inverted and located in plane 42, onto plane 50, which is located on the optical axis 41 of the projection part. The source image 52 formed on plane 50 is erect and the imaging is accomplished by means of projection lens 46. Plane 50 could correspond, for example, to a motion picture theater screen, the film plane in a photographic camera, the image plane in a photographic printer, or the image plane in a solid-state imaging device.

The optical convolution part 60 includes distributed light source 62, which is placed in the front focal plane of lens 66. The distanced f in FIG. 4 corresponds to the front focal length of lens 66. Both distributed light source 62 and lens 66 are located on optical axis 61 of the convolution part. Immediately behind lens 66 is placed an optical mask 70. The image formed at plane 68 due to optical mask 70 preferably bears an inverted version of the encoding carrier image. It should be appreciated that, alternatively, optical mask 70 could correspond to the inverted data image instead of the inverted encoding carrier image. Thus the transmittance at plane 68 due to optical mask 70 is given by:

$$\tau_{70} = \tau_C(-x_{68}, -y_{68}), \qquad \text{Eqn. 1}$$

where $(x_{68}, y_{68})$ are co-ordinates in plane 68. Optical mask 70 is preferably a (static) transparency, however it could be an updateable SLM. At a distance d from plane 68 and immediately in front of lens 76 is a second optical mask 74. Optical mask 74 preferably corresponds to the erect data image, although it could also correspond to the erect carrier image. Accordingly, the transmittance at plane 72 due to optical mask 74 is given by:

$$\tau_{74} = \tau_D(+x_{72}, +y_{72}), \qquad \text{Eqn. 2}$$

where $(x_{72}, y_{72})$ are co-ordinates in plane 72. Optical mask 74 is preferably an updateable SLM, however it could be a (static) transparency.

Mirror 78 and beam combiner 48 are located on optical axes 61 and 41, respectively, and are oriented such that the two axes coincide along axis 81. Furthermore, mirror 78 and beam combiner 48 are positioned such that the back focal length of lens 76, which is also assumed to be equal to f is equal to the distance $s_1+s_2+s_3$, where distances $s_1$, $s_2$, and $s_3$ are defined in FIG. 4. In this way, the back focal plane of lens 76 is made co-incident with the plane 50.

Consider a particular point 64 with co-ordinates $(x_{64}, y_{64})$ of light source 62. As shown in FIG. 4, an image of light source point 64 is formed at point 84 in plane 50 by lenses 66 and 76. It can be shown that the intensity pattern 82 across the back focal plane of lens 76 due to all points of light source 62 is given by the convolution of the encoding carrier image and the data image:

$$I_{82}(x_{50}, y_{50}) = k \int \int \tau_C\left(\frac{d}{f}x_{50} - x, \frac{d}{f}y_{50} - y\right)\tau_D(x, y)dxdy, \quad \text{Eqn. 3}$$

where k is a constant. (See pages 162–163, *Introduction to Fourier Optics* by Joseph W. Goodman, McGraw-Hill Book Company, 1968.) The co-ordinates $(x_{50}, y_{50})$ in Eqn. 3 refer to positions in plane 50. It should be appreciated that adjustment of the relative values of the parameters d and f permit magnification or reduction of pattern 82 in plane 50 and that the focal lengths of lenses 66 and 76 need not be equal to one another.

Consequently, it can be seen that the image formed in plane 50 is the optical superposition of an image equivalent to the updateable spatially dispersed data image and the source image as required.

The Fourier transform of a given amplitude distribution pattern can be obtained at the back focal plane of a lens providing that a transparency with transmittance corresponding to the given pattern is placed in the front focal plane of the lens and illuminated with collimated coherent light. (See, for example, pages 166–168, *Introduction to Fourier Optics* by Joseph W. Goodman, McGraw-Hill Book Company, 1968.) Recording of both the amplitude and the phase information contained in a Fourier transform, however, is generally problematic. Vander Lugt filters represent a well-known means of overcoming this problem. These filters are synthesized by exposing high-resolution film to the coherent interference pattern obtained from a collimated reference plane wave and the Fourier transform of the desired amplitude distribution pattern. The reference wave is incident on the high-resolution film at an angle θ to the normal to the film. (See pages 171–177, *Introduction to Fourier Optics* by Joseph W. Goodman, McGraw-Hill Book Company, 1968.)

Figure 5:
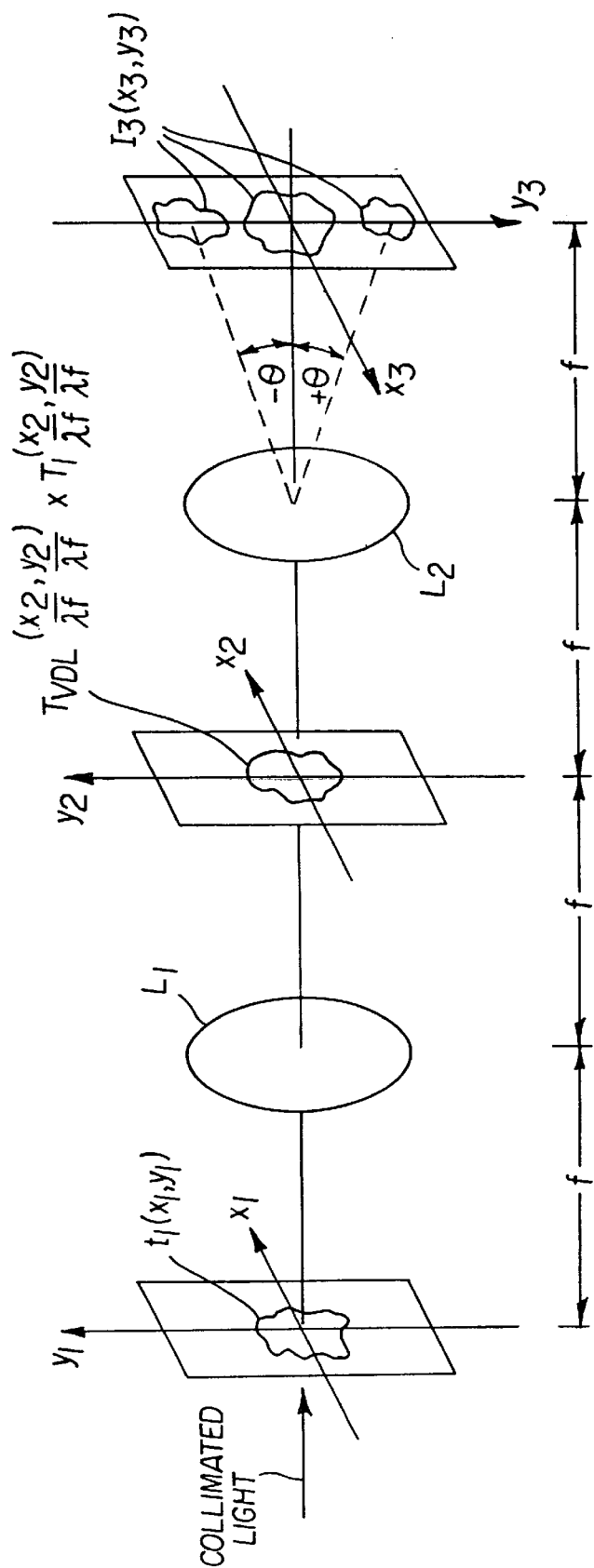
FIG. 5 is a schematic diagram illustrating a known method for using a Vander Lugt filter to obtain by optical means in the frequency domain both the convolution and the cross correlation of one image with another.

FIG. 5 illustrates schematically a means known in the art of using a Vander Lugt filter to obtain the convolution of two patterns in the frequency domain. A transparency, $\tau_1(x_1, y_1)$, is formed such that it has a space-varying transmittance that corresponds to the first of the two patterns. This transparency is placed in the back focal plane of lens $L_1$, which is characterized by focal length f, and illuminated from the left with collimated coherent light. Lens $L_1$ is referred to as the "Fourier transform lens" since the distribution of light appearing in the front focal plane of $L_1$ is the Fourier transform of $\tau_1(x_1, y_1)$. A Vander Lugt filter with transmission $T_{VDL}(\eta_2, \xi_2)$ is synthesized from the second of the two patterns and is placed in the front focal plane of lens $L_1$, where $$(\eta_2, \xi_2) = \frac{(x_2, y_2)}{\lambda f} \quad \text{Eqn. 4}$$

and λ is the wavelength of the coherent light. The complex amplitude of the light transmitted through the Vander Lugt filter is therefore proportional to the product of $T_{VDL}(\eta_2, \xi_2)$ and $T_1(\eta_2, \xi_2)$, where $T_1(\eta_2, \xi_2)$ is the Fourier transform of the first pattern. If the Vander Lugt filter is placed in the back focal plane of lens $L_2$, which is also assumed to have focal length f, then the image, $I(x_3, y_3)$, appearing in the front focal plane of lens $L_2$ is proportional to the inverted intensity distribution corresponding to the inverse Fourier transform of the product $T_{VDL}(\eta_2, \xi_2) \cdot T_1(\eta_2, \xi_2)$. Lens $L_2$ is referred to as the "inverse Fourier transform lens". The co-ordinates $(x_3, y_3)$ represent (inverted) positions in the front focal plane of inverse Fourier transform lens $L_2$. It can be shown that this image is comprised of three regions that are displaced from one another in space as shown in FIG. 5. If it is assumed that the reference wave angle of incidence, θ, lies in the plane defined by the normal to the Vander Lugt filter and the $y_3$ axis, then one region is centered on the optical axis and the centers of the other two regions are displaced by the distances ±fθ, respectively, along the $y_3$ axis. The region centered at $y_3 = +f\theta$ corresponds to an inverted image of the cross correlation of the two patterns and the region centered at $y_3 = -f\theta$ corresponds to an inverted image of the convolution of the two patterns. If θ is chosen to be sufficiently large, the convolution and cross correlation images will be deflected (in opposite directions) sufficiently far off-axis to be viewed independently. If $W_1$ and $W_2$ are the widths of the original two patterns, respectively, along the y direction, then it is straightforward to show that the angle θ must satisfy the following condition:

$$\theta > \frac{3}{2}\frac{W_2}{f} + \frac{W_1}{f}. \quad \text{Eqn. 5}$$

Figure 6A:
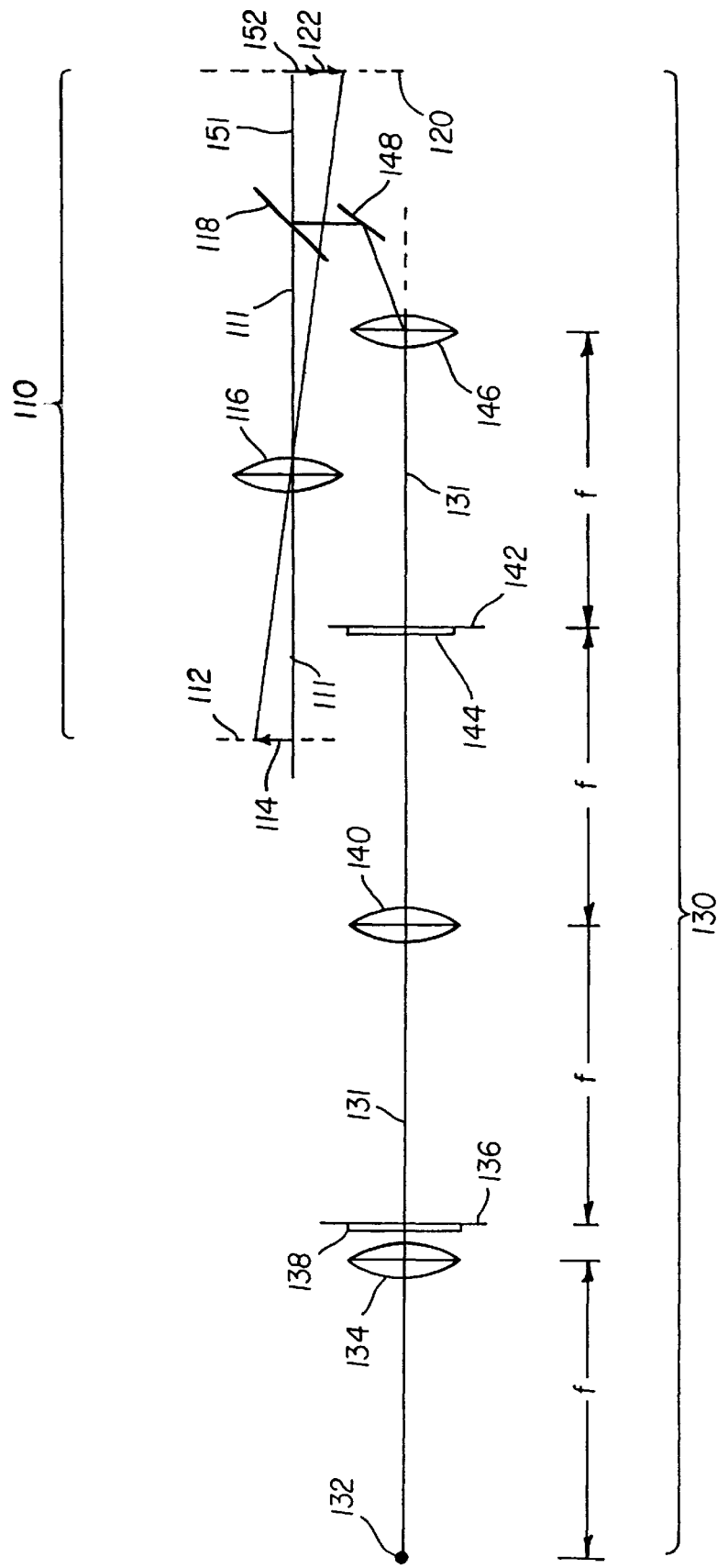
FIG. 6a is a schematic diagram illustrating an alternative method for optically convolving in the frequency domain the updateable data image with the encoding carrier image and adding the resultant spatially dispersed data image to the source image according to the present invention.
Figure 6B:
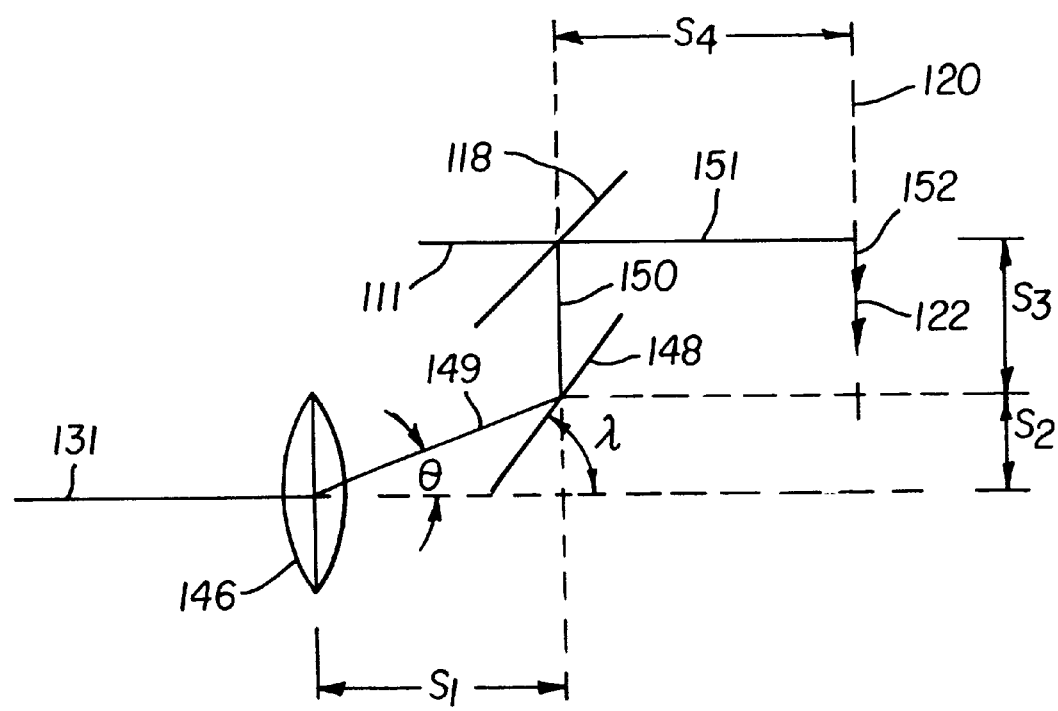

FIGS. 6a and 6b show schematic diagrams of a second embodiment of an optical apparatus, according to the present invention, for embedding an updateable hidden image in a source image using the phase dispersion method. In this embodiment, convolution of the data and encoding carrier image is accomplished in the frequency domain. As in the first embodiment of the invention, the optical apparatus shown in FIGS. 6a and 6b comprises two distinct parts: an optical projection part 110 and an optical convolution part 130.

The optical projection part 110 images the source 114, which is erect and located in plane 112, onto plane 120, which is located on the optical axis 111 of the projection part. The source image 122 formed on plane 120 is inverted and the imaging is accomplished by means of projection lens 116. Plane 120 could correspond, for example, to a motion picture theater screen, the film plane in a photographic camera, the image plane in a photographic printer, or the image plane in a solid-state imaging device.

The optical convolution part 130 includes a coherent light source 132, which is placed in the front focal plane of collimating lens 134. For the sake of simplicity, it is assumed that collimating lens 134 along with all other lenses in the convolution part 130 are characterized by the same focal length f, as shown in FIG. 6a. It should be understood, however, that these lenses could have focal lengths that are not equal to one another. Both coherent light source 132 and collimating lens 134 are located on the optical axis 131 of the convolution part. Immediately behind collimating lens 134 is placed updateable optical mask 138, which is formed by a SLM. Updateable optical mask 138 bears transparency $\tau_1(x_1,y_1)$ mentioned previously. Accordingly, the pattern born by updateable optical mask 138 generates an image in plane 136, which corresponds to the back focal plane of Fourier transform lens 140. The image formed by optical mask 138 preferably corresponds to the data image, although updateable optical mask 138 could correspond to the encoding carrier image instead of the data image. Vander Lugt filter 144 is positioned on optical axis 131 in plane 142. Plane 142 is the back focal plane of inverse Fourier transform lens 146. Vander Lugt filter 144 is synthesized preferably from the encoding carrier pattern and an appropriate reference wave, although it could also be synthesized from the data pattern and an appropriate reference wave. The reference wave angle, θ, is selected so that the condition specified in Eqn. 5 is satisfied, wherein $W_1$ and $W_2$ are, respectively, the widths along the y direction of the data and encoding carrier patterns in a preferable embodiment.

Mirror 148 and beam combiner 118 are located on optical axes 131 and 111, respectively. Mirror 148 and beam combiner 118 are positioned such that the center of intensity pattern 152, which is the inverted convolution of the data and the encoding carrier patterns, is positioned at the intersection of ray segment 151 with plane 120. As shown previously in connection with FIG. 5, the ray corresponding to the center of pattern 152 is deflected by the angle –θ with respect to the optical axis, which results in a displacement of the center of pattern 152 by a distance $y_3$=–fθ in the image plane. Accordingly, axis 111 will coincide along ray segment 151, and the center of pattern 152 will be located at the center of plane 120 as shown in FIG. 6a and FIG. 6b providing $$f\sqrt{1+\theta^2} \approx \sqrt{s_1^2+s_2^2}+s_3+s_4,$$ Eqn. 6a $$s_2 \approx s_1\theta, \text{ and}$$ Eqn. 6b $$\gamma = \frac{\pi}{4} + \frac{\theta}{2}.$$ Eqn. 6c FIG. 6b shows in detail the arrangement of inverse Fourier transform lens 146, mirror 148, beam combiner 118, and plane 120. The distances $s_1$, $s_2$, $s_3$, and $s_4$ are also shown in FIG. 6b along with angles γ and θ, both of which are given in radians. The ray extending from the center of inverse Fourier transform lens 146 to the center of pattern 152 is shown in FIG. 6b as being comprised of ray segments 149, 150, and 151. The lengths of these ray segments are $\sqrt{(s_1^2+s_2^2)}$, $s_3$, and $s_4$, respectively. Ray segment 151 is coincident with optical axes 111 as shown in FIG. 6b.

The focal lengths of Fourier transform lens 140 and inverse Fourier transform lens 146 have been assumed to be equal to one another. However, it should be appreciated that adjustment of the relative values of these focal lengths will permit magnification or reduction of pattern 152 in plane 120.

Consequently, it can be seen that the image formed in plane 120 is the optical superposition of an image equivalent to the updateable spatially dispersed data image and the source image as required.

There are advantages and disadvantages associated with each of two embodiments described above. The spatial domain embodiment has the advantage that it has fewer optical components and does not require a coherent light source. Furthermore, this embodiment is flexible in that either the data pattern, or the encoding carrier pattern, or both of these two patterns can be formed by updateable SLM's. On the other hand the, the spatial domain embodiment represents an incoherent processing system. It is therefore based on geometric optics. Consequently the geometry of the system must be chosen in such a way that diffraction effects are entirely negligible. This imposes a constraint on the space-bandwidth product, which in turn places a limitation on the number of independent data points that are contained in the data and the encoding carrier patterns. Another way of stating this constraint is that the maximum frequency component, $F_{MAX}$, in the Fourier spectrum of either the data or the encoding carrier patterns must be limited according to the relationship:

$$F_{MAX} << \frac{1}{\lambda},$$ Eqn. 7 where λ is the typical wavelength in the spectrum of the incoherent source. Generally this condition will be violated for patterns in which there is a sharp discontinuity in the intensity (i.e., at sharp edges). Another limitation imposed by the incoherence of the light source is that both patterns are restricted to being nonnegative (intensity) distributions. There is no simple way of processing bipolar patterns when incoherent illumination is used.

The frequency domain embodiment, on the other hand, is based on coherent illumination. Diffraction effects are explicitly taken into account in coherent systems. Furthermore, optical masks with transmission functions that contain both phase as well as amplitude variations (i.e., Vander Lugt filters) can be devised for coherent optical systems. Consequently, a broader range of data and encoding carrier patterns are possible for this embodiment. Unfortunately, the frequency domain embodiment is more complex than the spatial domain embodiment in that it requires a coherent light source and more optical components. In addition, the frequency domain embodiment is less flexible since only one of the two patterns (preferably the data pattern) can be formed from an updateable SLM.

U.S. Pat. No. 5,859,920 teaches that tiling the source image and embedding the same data image in each tile independently improves the robustness of the data extraction process to alterations of the data embedded image. Such alterations include cropping, rotation, and scaling. Tiling can be incorporated in either embodiment of the current invention by appropriate modification of one of the two optical masks. As an example, a simple method of incorporating the tiling feature in the optical mask bearing the updateable data image is illustrated schematically in FIG. 7a. It should be appreciated, however, that the same method is applicable if the optical mask is a static transparency or if the pattern corresponds to the encoding carrier image.

Figure 7A:
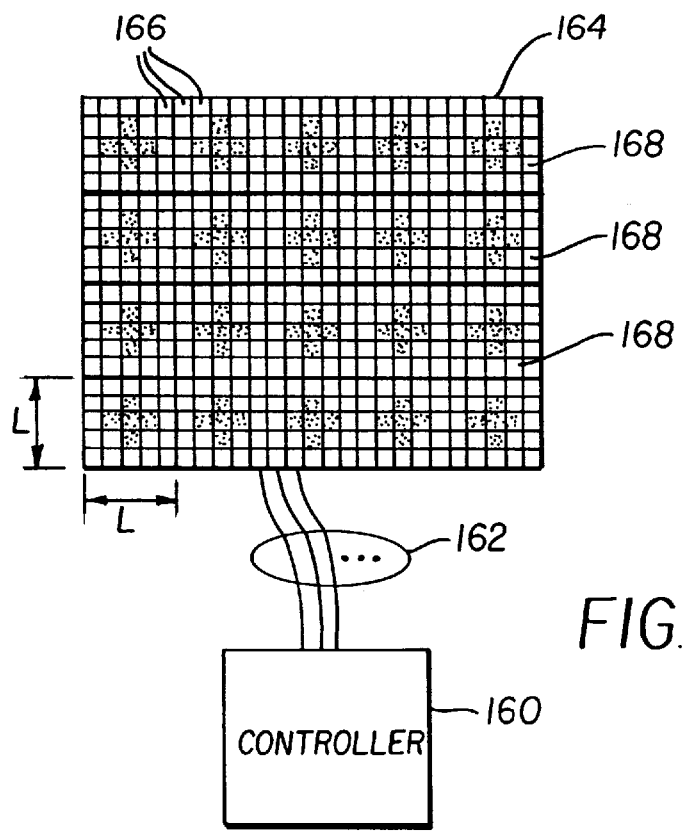
FIG. 7a is a schematic diagram illustrating optical method of tiling an updateable data image.

Referring again to FIG. 7a, controller 160 is used to compose the data image and corresponding electronic signals are sent via connections 162 to SLM 164. SLM optical mask 164 is comprised of a plurality of light shutters or gates 166 such that the each light gate is controlled by the electronic signal from the controller via one of the connections 162. The intensity level of light transmitted through each gate varies in a continuous way in response to the electronic signal. In this way, multiple tiles 168 of the same two-dimensional transmission pattern are formed on the SLM as shown in FIG. 7a. The transmission pattern of each tile 168 corresponds to a multi-level data image or to a grayscale iconic image. It.is assumed that the SLM optical mask 164 shown in FIG. 7a comprises N tiles in the horizontal and M tiles in the vertical direction where the dimensions of each individual tile 168 are L×L.

Figure 7B:
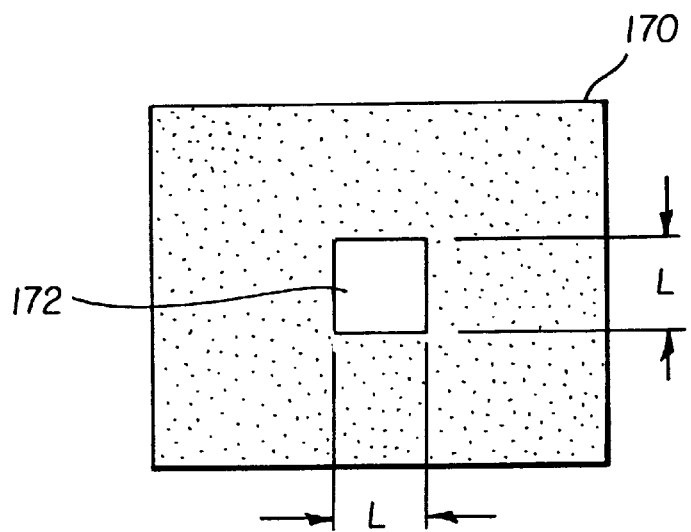

FIG. 7b is a schematic diagram of the optical mask bearing the encoding carrier pattern, which is used with the tiled optical mask shown in FIG. 7a. Optical mask 170 bearing the encoding carrier pattern 172 is opaque everywhere except in the L×L region corresponding to the encoding carrier pattern as shown in the figure.

Figure 7C:
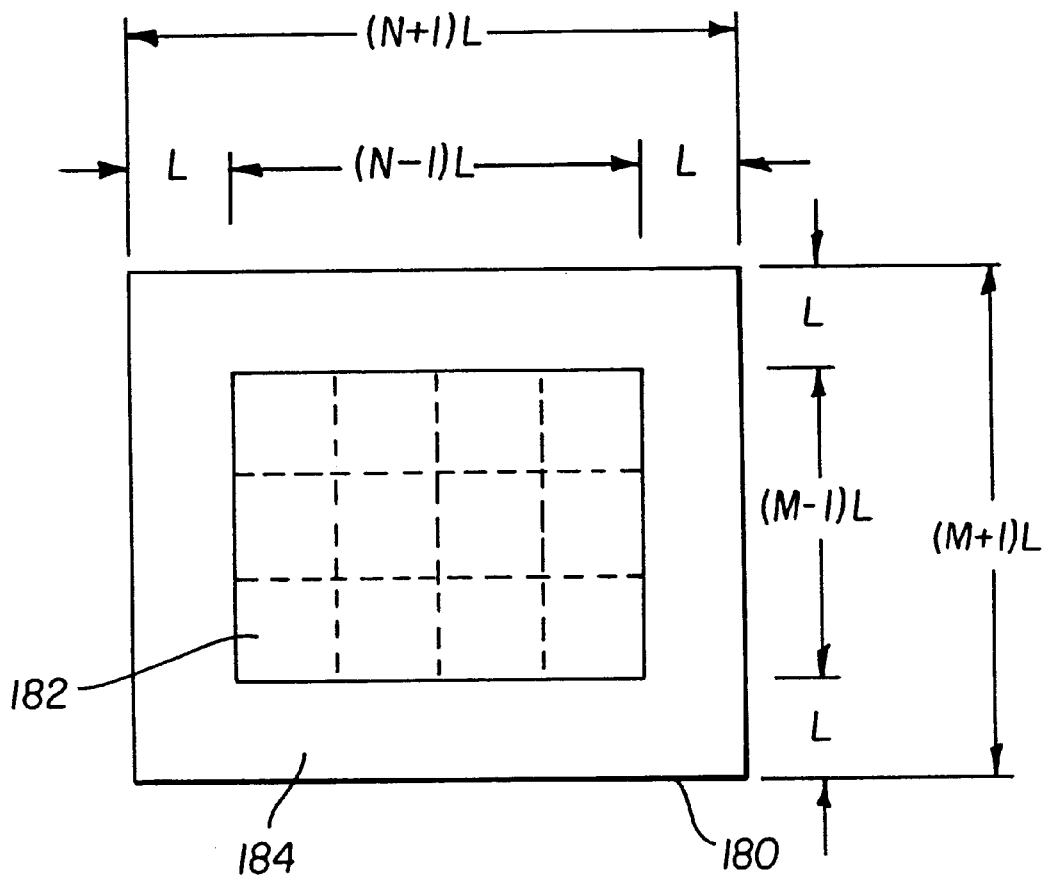
FIG. 7c shows the cyclic and acyclic regions of the pattern resulting from the optical convolution of the patterns shown in FIGS. 7a and 7b.

The "final image plane" is defined here to be plane 50 shown in FIG. 4 for the spatial domain embodiment or plane 120 shown in FIG. 6a for the frequency domain embodiment. If the tiled pattern of optical mask 164 shown in FIG. 7a is optically convolved with the pattern 172 of optical mask 170 shown in FIG. 7b, the resultant pattern 180 appearing in the final image plane will have dimensions (N+1)L×(M+1)L as shown in FIG. 7c. It is assumed here that the magnification is unity. As mentioned previously, this implies that $$\frac{d}{f} = 1$$

in the spatial domain embodiment or that $$\frac{f_2}{f_1} = 1$$

in the frequency domain embodiment, where $f_1$ and $f_2$ are the focal lengths of Fourier transform the inverse Fourier transform lenses, respectively. It turns out that the convolution in pattern 180 is equivalent to cyclic convolution in region 182, which comprises the central (N−1)L×(M−1)L portion of the pattern as shown in FIG. 7c. However, region 184 of convolution pattern 180, which comprises an outer rim of width L, does not correspond to cyclic convolution. Therefore, in order to avoid artifacts due to the rim region 186 of convolution pattern 180, it is desirable to adjust the magnification of either convolution pattern 180 or of the original source image such that the original source image falls inside region 182. In this way, a tiled spatially dispersed data image is superimposed optically on the source image as required.

In some applications of the present invention, it is necessary to synchronize the updating of the optical masks (for the data image and/or encoding carrier image) with the optical projection part 40 or 110. An example is the projection of motion pictures, where it is advantageous to update the data image or encoding carrier image at certain time intervals, as described previously. In a conventional film-based movie projector, each frame of the motion picture is displayed using a shutter mechanism that transitions from fully open to fully closed. The shutter may actually open and close several times during the projection of a single frame (a process known as "double shuttering" or "triple shuttering"). This shuttering mechanism serves two purposes. The first is to provide a dark interval in which to advance to the next frame, and the second is to raise the display rate so that it is above the threshold of human flicker perception. By opening and closing the shutter several times for each frame, the motion picture is perceived as having continuous motion instead of a series of individual frames. It is desirable to update the optical masks during the dark interval to minimize the perception of the spatially dispersed data image by a viewer in the theater. This synchronization of the optical mask updating to the projected source images can be achieved by a variety of techniques. One simple method is to use the time codes ("SMPTE" time codes) that are included on motion picture films as a means for synchronizing the audio tracks and the projected frames. These time codes can easily be used to control the timing of the electronic signals to the updateable optical masks.

In the present invention, the light pattern that represents the spatially dispersed data image is added to the light pattern of the source image to form the final projected image. Regardless of the specific nature of the data image and embedding carrier image, the light pattern corresponding to the spatially dispersed data image can be represented as a mean light intensity with fluctuations around the mean intensity. The mean light intensity will produce an overall illumination increase at the final image plane, which is analogous to "flare" that can occur in an optical system. This overall illumination increase can lower the perceived quality of the projected source image, and to preserve the quality of the source image, it is necessary to minimize the mean light intensity that is added by the spatially dispersed data image. If the fluctuations of the spatially dispersed data image are confined to the range ±Δ that is centered at the mean light intensity, then mean light intensity should be set to a value of +Δ. Consequently, the actual light intensities will range from 0 to +2Δ. This range of light intensities can be produced by appropriate selections for the illumination source intensity and the transmittances of the optical masks that are used for the data image and embedding carrier images.

Means for extracting the hidden image are disclosed in U.S. Pat. No. 5,859,920 and include both computational as well as optical techniques. If computational techniques are used, the source image containing the embedded data must be digitally scanned in order to create a data-embedded source file. Computational processing is then used to determine rotation, scaling, and finally to retrieve the hidden data by means of a numerical cross-correlation of the data-embedded source file with the encoding carrier key file. If optical techniques are used, an optical mask or transparency of the source image containing the embedded data must be created. Optical cross-correlation techniques, which are known in the art, can then be used to extract the hidden data. This extraction can be carried out in either the spatial domain or in the frequency domain. It will be appreciated, however, that the mask bearing the encoding carrier key can be generated from either a static transparency or an updateable SLM.

The invention has been described in detail with particular reference to certain preferred embodiments thereof, but it will be understood that variations and modifications can be effected within the spirit and scope of the invention.

PARTS LIST

10 generate multi-level data image step (prior art)
12 convolve data image with encoding carrier image step (prior art)
14 add spatially dispersed data image to source image step (prior art)
16 cross correlate step (prior art)
18 extract data step (prior art)
20 photographic transparency bearing source image (prior art)
22 photographic transparency bearing spatially dispersed data image (prior art)
24 printing gate (prior art)
26 exposed photographic paper (prior art)
28 contact transparency with spatially dispersed data image (prior art)

30 controller for composing the electronic signals that control transmissions of individual light gates in SLM 34
32 control lines that relay the electronic control signals from controller 30 to SLM 34
34 updateable optical mask formed by a spatial light modulator
36 plurality of individually addressable light gates comprising SLM 34
38 transmission pattern formed by the light gates of SLM 34 corresponding to a particular iconic image that is to be hidden in the original source image
40 projection part of the spatial domain embodiment of the invention
41 optical axis of the projection part
42 plane in which inverted image of the original source image is formed
44 inverted image of original source image
46 projection lens
48 beam combiner
50 final image plane of spatial domain embodiment of the invention
52 erect image of original source image, which is formed in final image plane 50
60 convolution part of the spatial domain embodiment of the invention
61 optical axis of the convolution part
62 incoherent illumination source
64 point on the surface of incoherent illumination source 62
66 lens
68 plane in which (preferably) is formed an inverted version of the encoding carrier image
70 (preferably) static optical mask bearing inverted version of encoding carrier image
72 plane in which (preferably) is formed an erect image of the data image which is to be hidden in the original source image
74 (preferably) updateable optical mask formed by a SLM and which bears the erect data image
76 lens
78 mirror
81 segment of optical axis along which optical axes 41 and 61 coincide
82 erect image of convolution of data image an encoding carrier image, which is formed in final image plane 50
84 point corresponding to image of illumination point 64 in final image plane 50
110 projection part of the frequency domain embodiment of the invention
111 optical axis of the projection part
112 plane in which erect image of the original source image is formed
114 erect image of original source image
116 projection lens
118 beam combiner
120 final image plane of frequency domain embodiment of the invention
122 inverted image of original source image, which is formed in final image plane 120
130 convolution part of the frequency domain embodiment of the invention
131 optical axis of the convolution part
132 coherent light source
134 collimating lens
136 plane in which (preferably) is formed an erect image of the data image which is to be hidden in the original source image
138 updateable optical mask formed by a SLM and which bears the erect data image
140 Fourier transform lens
142 plane in which is formed a distribution of light, the complex amplitude of which is the product of the Fourier transform of (preferably) the data image and the transmission of Vander Lugt filter 144
144 Vander Lugt filter synthesized from a plane wave and a transparency bearing (preferably) the encoding carrier image
146 inverse Fourier transform lens
148 mirror
149 segment of optical axis 131 that is deflected by Vander Lugt filter 144 and that extends from the center of inverse Fourier transform lens 146 to mirror 148
150 segment of optical axis 131 that extends from mirror 148 to beam combiner 118
151 segment of optical axis along which optical axes 111 and 131 coincide
152 inverted image of convolution of data image and encoding carrier image, which is formed in final image plane 120
160 controller for composing the electronic signals that control transmissions of individual light gates in SLM 164
162 control lines that relay the electronic control signals from controller 30 to SLM 164
164 updateable optical mask formed by a spatial light
166 plurality of individually addressable light gates comprising SLM 164
168 tile formed by the light gates of SLM 164, the transmission pattern of which corresponds to a particular iconic image that is to be hidden in the original source image
170 optical mask bearing encoding carrier image used to form tiled convolution
172 encoding carrier pattern
180 tiled optical convolution appearing in final image plane
182 portion of tiled optical convolution that is equivalent to cyclic convolution
184 portion of tiled optical convolution this is not equivalent to cyclic convolution

What is claimed is:

1. An apparatus for optically embedding hidden data in a source image, wherein the hidden data is updated in real-time, comprising:
   a) optical masks bearing a data image and an encoding carrier image, either or both of which is updated in real-time at pre-specified time intervals;
   b) optical components for convolving the data image with the encoding carrier image to produce a spatially dispersed data image; and
   c) optical beam combiner for combining the spatially dispersed data image with the source image to produce a source image containing embedded hidden data.

2. The apparatus as in claim 1, wherein the optical masks are updated electronically.

3. The apparatus as in claim 2, wherein the electronically updateable optical masks are spatial light modulators.

4. The apparatus as in claim 1, wherein the source image is a sequence of individual frames with an associated display rate and the optical masks are updated synchronously with the display rate.

5. The apparatus as in claim 1, wherein the optical components performing the optical convolution of the data image and the encoding carrier image operate in the spatial domain using incoherent illumination, and wherein either one or both of the data image and the encoding carrier image are formed by at least one updateable optical mask.

6. The apparatus as in claim 1, wherein the optical components performing the optical convolution of the data image and the encoding carrier image operate in the frequency domain using coherent illumination and wherein only one of the data image and the encoding carrier image is formed by an updateable optical mask and the other is formed by a static optical mask.

7. The apparatus as in claim 6, wherein the static optical mask is a Vander Lugt filter.

8. A method for optically embedding hidden data in a source image, wherein the hidden data is updated in real-time, the method comprising the steps of:

a) providing optical mask bearing a data image and an encoding carrier image, either or both of which is updated in real-time at pre-specified time intervals;

b) convolving the data image with the encoding carrier image to produce a spatially dispersed data image; and c) combining the spatially dispersed data image with the source image to produce a source image containing embedded hidden data.

9. The method as in claim 8, wherein the updating is performed electronically.

10. The method as in claim 9 further comprising using spatial light modulators for the electronic updating.

11. The method as in claim 8 further comprising the step of providing the source image as a sequence of individual frames with an associated display rate and the optical masks are updated synchronously with the display rate.

12. The method as in claim 8, wherein the optical convolution of the data image and the encoding carrier image is accomplished in the spatial domain using incoherent illumination and wherein either one or both of the data image and the encoding carrier image are formed by at least one updateable optical mask.

13. The method as in claim 8, wherein the optical convolution of the data image and the encoding carrier image is accomplished in the frequency domain using coherent illumination and wherein only one of the data image and the encoding carrier image is formed by an updateable optical mask and the other is formed by a static optical mask.

14. The method as in claim 13 further comprising using a Vander Lugt filter as the static optical mask.

\* \* \* \* \*